US007010281B2

(12) United States Patent
Ukena et al.

(10) Patent No.: US 7,010,281 B2
(45) Date of Patent: Mar. 7, 2006

(54) ARRAY ANTENNA APPARATUS UTILIZING A NONLINEAR DISTORTION COMPENSATOR CIRCUIT

(75) Inventors: Masato Ukena, Kanagawa (JP); Shinichiro Takabayashi, Kanagawa (JP); Masayuki Orihashi, Chiba (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 408 days.

(21) Appl. No.: 10/635,731

(22) Filed: Aug. 6, 2003

(65) Prior Publication Data

US 2004/0085239 A1 May 6, 2004

(30) Foreign Application Priority Data

Aug. 9, 2002 (JP) ............................ 2002-232417
Jun. 20, 2003 (JP) ............................ 2003-176514

(51) Int. Cl.
*H04B 1/04* (2006.01)

(52) U.S. Cl. ................................ 455/127.1; 455/114.3; 455/562.1; 455/67.11

(58) Field of Classification Search ............. 455/127.1, 455/127.2, 127.5, 561, 562.1, 63.1, 67.11, 455/67.13, 114.2, 115.1, 114.3, 108, 67.12, 455/10

See application file for complete search history.

(56) References Cited

U.S. PATENT DOCUMENTS

| | | | | |
|---|---|---|---|---|
| 6,449,466 | B1 * | 9/2002 | Jin et al. | 455/127.2 |
| 6,751,447 | B1 * | 6/2004 | Jin et al. | 455/114.3 |
| 2002/0123372 | A1 * | 9/2002 | Kobayakawa | 455/562 |
| 2002/0163977 | A1 * | 11/2002 | Kobayakawa | 455/67.11 |

FOREIGN PATENT DOCUMENTS

| | | | |
|---|---|---|---|
| JP | 2002-190712 | * | 5/2002 |
| JP | 2002-190712 | | 7/2002 |

* cited by examiner

*Primary Examiner*—Edward F. Urban
*Assistant Examiner*—Lana Le
(74) *Attorney, Agent, or Firm*—RatnerPrestia

(57) ABSTRACT

Amplitude phase distortion adding sections are provided for the power amplifiers on the antenna arrays greater in amplitude weighting while amplitude distortion adding sections are provided for the power amplifiers on the antenna arrays smaller in amplitude weighting. Due to this, because a required amount of distortion compensation is made based on each antenna array, there is no bad effect upon the adjacent other antenna array, suppressing the deterioration in beam control accuracy. This, also, reduces the size of the apparatus and improves the power efficiency on the array antenna apparatus overall.

15 Claims, 16 Drawing Sheets

ARRAY ANTENNA APPARATUS UTILIZING A NONLINEAR DISTORTION COMPENSATOR CIRCUIT

FIELD OF THE INVENTION

This invention relates to an array antenna apparatus, for use on a communications apparatus of a radio communications system, having a nonlinear distortion compensator to compensate for a nonlinear distortion caused over a transmission system.

BACKGROUND OF THE INVENTION

There is known an antenna array apparatus arranging a plurality of antennas to thereby control the directivity thereof, as an antenna apparatus included in a transmitter of a radio communications system.

By using such an array antenna apparatus, a beam having an acute directivity can be formed in a desired direction. This enables control, to raise the frequency utilization efficiency by reducing the repeated distance at the same frequency, or to control the null point in order not to radiate a radio wave in unwanted directions.

The array antenna, generally, has a plurality of antennas. The antennas are respectively connected with power amplifiers for supplying signals. RF signals generated are amplified by the power amplifiers and then radiated through the antennas. However, the nonlinear distortion caused upon amplification by the power amplifier forms a factor to deteriorate beam control accuracy over the array antenna apparatus. For this reason, there is proposed, as a countermeasure, an array antenna apparatus having distortion compensator circuits arranged for all or part of the power amplifiers connected one-to-one to the antennas.

On the array antenna apparatus, provided are distortion compensator circuits on part or all of the antenna arrays. The IQ signal is added by such a distortion as to compensate for a nonlinear distortion occurred in the power amplifier. Due to this, the array antenna apparatus is configured high in beam control accuracy, small in size but low in consumption power.

FIG. 13 shows an array antenna apparatus having distortion compensators only for the power amplifiers of part of antenna arrays.

In FIG. 13, a signal generating section 90 is to output therefrom a transmission IQ signal 902.

A beam-direction control section 913 is to output therefrom a beam-direction control signal 914.

An amplitude-phase control section 903 is to input therein a transmission IQ signal 902 and beam-direction control signal 914 and to output a transmission IQ signal 904 controlled in amplitude and phase.

A frequency converting section 905 is to input therein a transmission IQ signal 904 controlled in amplitude and phase and to output an RF signal 906.

A power amplifier 907 is to input therein an RF signal and to output an amplified RF signal 909.

An antenna 909 is to input therein an amplified RF signal 906 and to radiate a radio wave through the antenna.

A distortion adding section 910 is to input therein an IQ signal 904 controlled in amplitude and phase and to output an IQ signal 911 added with a distortion.

A frequency converting section 912 is to input therein an IQ signal 911 added with a distortion and to output an RF signal 906.

Furthermore, FIG. 14 shows one configuration example of an amplitude-phase control section 903 of a conventional array antenna apparatus.

The I signal 1001 and the Q signal 1002, generated in the signal generating section, are respectively multiplied by weighting functions X and Y for amplitude weighting and phase rotation. These are converted into an I signal 1005 amplitude-weighted and phase-rotated and a Q signal 1006 amplitude-weighted and phase-rotated. Meanwhile, the weighting functions X and Y used in this time are read out of the values of a correction value table 1004 determined by the beam-direction control signal 1003. This correction value table 1004 is known to be determined by previously measuring a distortion of a singular power amplifier to be used and compute a proper correction value by storing a previously computed correction value or feeding back an output signal of the power amplifier. Incidentally, $\phi$ in the correction value data 1004 shows a phase angle (this is true for the subsequent figures).

Meanwhile, FIG. 15 shows an configuration example of an amplitude-phase distortion adding section 910 of a conventional array antenna apparatus.

The I signal 1201 and the Q signal 1202, amplitude-weighted and phase-rotated in the amplitude-phase control section 903, are respectively multiplied by weighting coefficients X and Y in order to add a distortion in an amplitude direction and phase direction. Then, these are converted into an I signal 1204 added with an amplitude distortion and phase distortion and a Q signal 1205 added with an amplitude distortion and phase distortion. Meanwhile, the coefficients X and Y used to add a distortion in the amplitude and phase directions use a value of correction value table 1203 read out in accordance with an instantaneous power of the input I signal 1201 and Q signal 1202. The correction value table 1203 is known to be determined by previously measuring a distortion of a power amplifier to be used and compute a proper correction value by storing a previously computed correction value or feeding back an output signal of the power amplifier. Incidentally, $I^2+Q^2$ in the correction value data 1203 shows an instantaneous power (this is true for the subsequent figures).

Meanwhile, conventionally, there is something like a description in JP-A-2002-190712 as an array antenna apparatus of this kind. FIG. 16 shows a configuration of the conventional array antenna apparatus described in the publication.

In FIG. 16, a transmission base-band signal 1501 is inputted to the frequency characteristic equalizing section 1502, to compensate for a frequency distortion occurred in each antenna array. The frequency characteristic equalizing section 1502 can be configured by a transversal filter. The frequency characteristic equalizing section 1502 has an output whose amplitude and phase is controlled for forming a beam by an amplitude-phase control section 1503. The amplitude-phase control section 1503 has an output to be input to a distortion compensating characteristic adding section 1504. In the distortion compensating characteristic adding section 1504, the input signal is added by a reverse characteristic to a nonlinear distortion occurred in a power amplifier 1506, depending upon an amplitude value of the input signal. The output of the distortion compensating characteristic adding section 1504, in a frequency converting section 1505, is converted into an RF band signal, and the output of the frequency converting section 1505 is amplified up to a required level by a power amplifier 1506. The power amplifier 1506 outputs a linear signal compensated for distortion whereby the signals sent at antennas 1507 are spatially combined together into a beam having a desired directivity. Meanwhile, a compensating-operation control section 1508 controls each distortion compensating characteristic adding section 1504 depending upon the information in a transmission power control signal 1509, thereby obtaining a desired transmission power.

However, the array antenna apparatus having distortion compensator circuits for the power amplifiers on part of antenna arrays has a problem that beam control accuracy deteriorates under the influence of a distortion caused by the power amplifier on the array not having a distortion adding section. Also, in the case of having a multiplicity of distortion compensator circuits, there is a problem that digital circuit increases in configuration to require a high consumption power.

Particularly, as compared to a QPSK modulation signal, when sending an OFDM or CDMA modulation signal having high peak vs. mean power ratio (PMPR), a difference in nonlinear distortion at between the power amplifiers in plurality is increased between upon transmitting a great power level signal and upon transmitting a small power level signal, resulting in deteriorated beam control accuracy.

The present invention has been made in order to solve the conventional problem, and it is an object thereof to provide an array antenna apparatus that nonlinear distortion is compensated, circuit configuration on the transmission system is size-reduced and consumption power efficiency is improved.

SUMMARY OF THE INVENTION

An array antenna apparatus, for solving the foregoing problems, applies distortion adding sections for adding both phase distortion and amplitude distortion to part of power amplifiers, and distortion adding sections for adding only amplitude distortion or only phase distortion to the other power amplifiers.

With this configuration, because a required amount of distortion compensation is made on each antenna array, beam control accuracy is suppressed from deteriorating without having a bad effect upon the other adjacent antenna arrays. Meanwhile, the distortion adding sections, for both distortion compensations, having a large circuit configuration are provided only on the antenna arrays requiring compensation for both amplitude and phase distortions. Accordingly, it is possible to reduce apparatus size and improve the power efficiency over the entire array antenna apparatus.

BEST MODE FOR CARRYING OUT THE INVENTION

Figure 1:
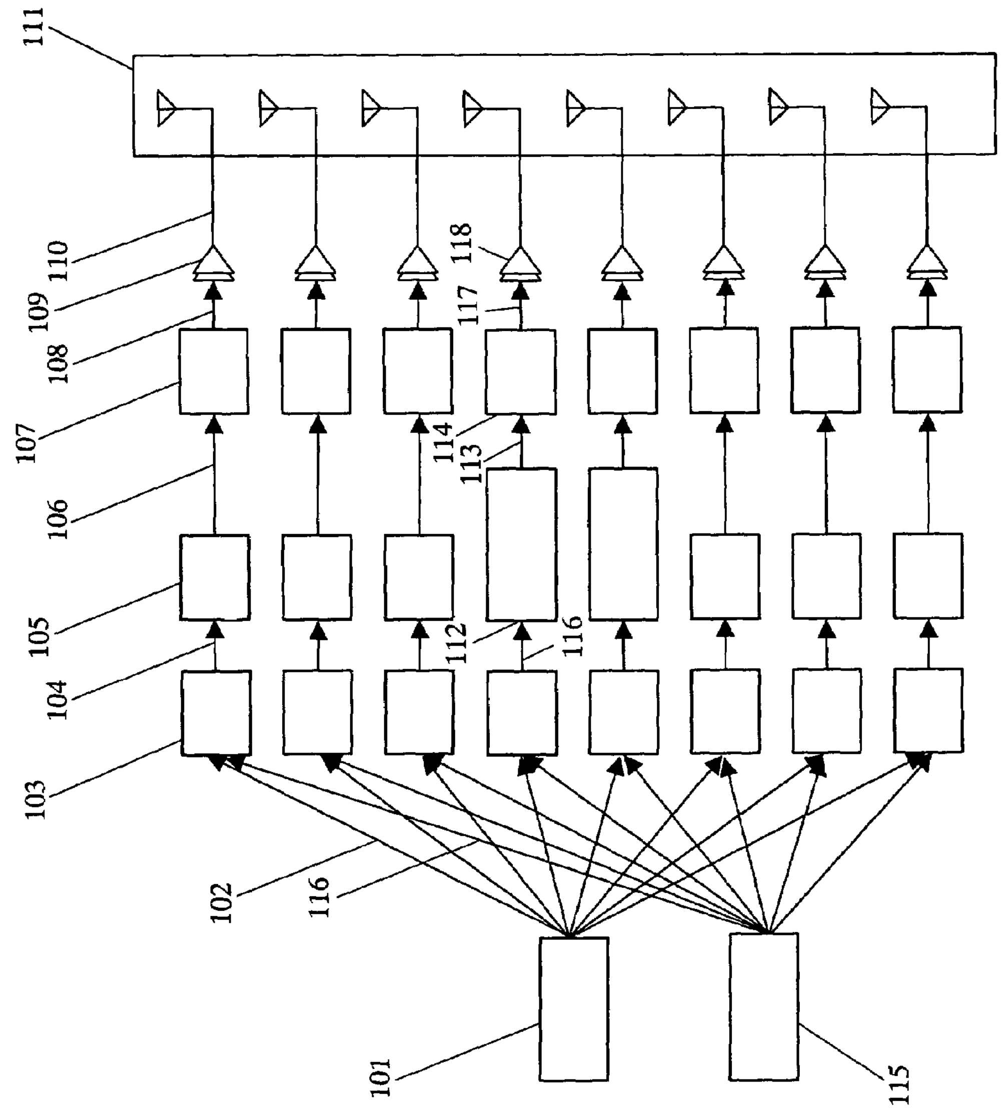
FIG. 1 is a configuration block diagram of an array antenna apparatus in a first embodiment of the present invention.

Embodiments of the present invention are demonstrated hereinafter with reference to the drawings. Note that, in the drawings, the same constituent elements are shown by the same references.

Embodiment 1

FIG. 1 shows a configuration of an array antenna apparatus of the present embodiment.

A signal generating section 101 is to generate a transmission IQ signal 102. A beam-direction control section 115 is to compute amplitude weights and phase rotation amounts suited for respective antenna arrays such that the total radiation patterns by a linear array antenna 111 are formed to a predetermined form, and outputs a beam-direction control signal 116 to amplitude-phase control sections 103. The amplitude-phase control section 103 is to control an amplitude and phase of a transmission IQ signal 102 in order to control the beam to a direction as designated by a beam-direction control signal 116, thereby outputting a transmission IQ signal 104. Specifically, the amplitude-phase control sections 103 of the linear array antenna are controlled with a gradually smaller amplitude as positioned closer to the end from the center. However, a phase is o degree at a centered antenna array. And phase is controlled with a gradual progress as positioned upper to the end from the center and is overdue as positioned down to the end from the center. Incidentally, the degree of control applied to an amplitude and phase is referred to as weighting.

An amplitude distortion adding section 105 has an amplitude distortion characteristic reverse to a nonlinear distortion possessed by a power amplifier 109 on the same array, to provide an output added with an amplitude distortion commensurate with the input signal. A frequency converting section 107, 114 is to convert the input signal into an RF signal 108, 117. A power amplifier 109, 118 is to amplify and output an input signal. A linear array antenna 111 has an input of amplified RF signal 110, to radiate a radio wave through the antenna. An amplitude-phase distortion adding section 112 has an amplitude distortion and phase distortion characteristic reverse to a nonlinear distortion possessed by the power amplifier 109 on the same array, to provide an output added with an amplitude distortion commensurate with the input signal.

Herein, explained is the nonlinear distortion possessed by the power amplifier 109. FIGS. 2A to 2E show an example of nonlinear distortion to occur in the transmitting-system power amplifier.

Figures 2A, 2B, 2C, 2D, 2E:
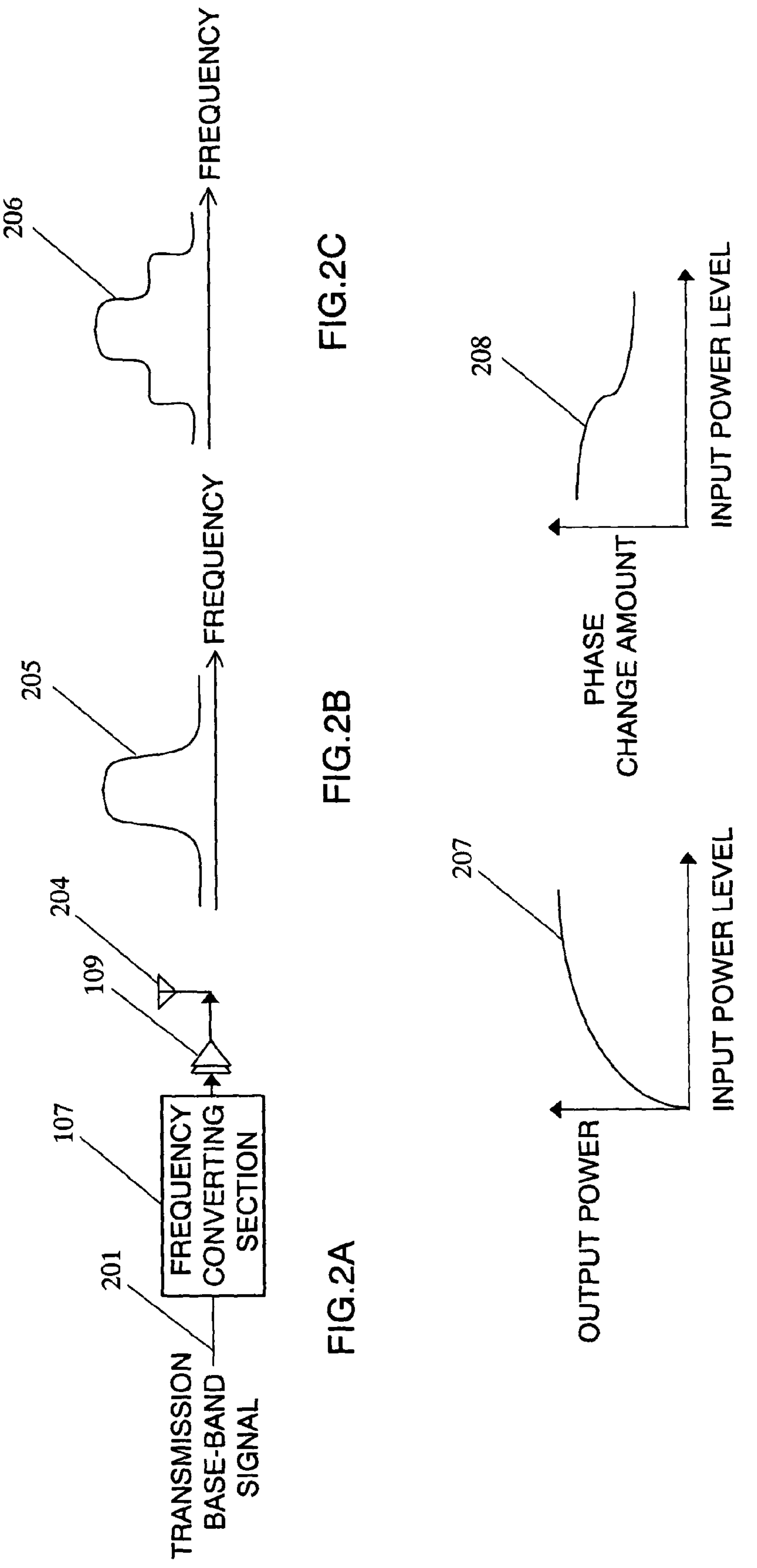
FIG. 2A is a circuit configuration diagram explaining a nonlinear distortion occurring in a power amplifier in the first embodiment of the invention.
FIG. 2B is a spectrum characteristic diagram of an input signal to the power amplifier in the first embodiment of the invention.
FIG. 2C is a spectrum characteristic diagram of an output signal from the power amplifier in the first embodiment of the invention.
FIG. 2D is a characteristic diagram showing an AMAM characteristic of the power amplifier in the first embodiment of the invention.
FIG. 2E is a characteristic diagram showing an AMPM characteristic of the power amplifier in the first embodiment of the invention.

In FIG. 2A, a transmission base-band signal 201 in the frequency converting section 107 is frequency-converted into an RF frequency band and amplified up to a desired power level by the power amplifier 109, then being radiated through an antenna 204.

Herein, the power amplifier 109 frequently is used in a nonlinear region because of a power consumption problem. Where a signal is inputted and amplified at an input power level in a nonlinear region, distortion is caused in an output signal.

FIGS. 2B and 2C are figures showing this phenomenon. For example, when a signal having a spectrum 205 shown in FIG. 2B, at a certain power level, is inputted to the power amplifier 109, a signal having a spectrum 206 shown in FIG. 2C appears in the output of the power amplifier 109.

At this time, the spectrum 206 of output signal has a band broadened in frequency and deteriorated in C/N, as compared to the input signal spectrum 205.

The deterioration results from, as one cause, a nonlinear distortion on the power amplifier 109. It is known that distortion occurs based on a main cause of two characteristics of the power amplifier.

One is an AMAM characteristic of the power amplifier, one example of wich characteristic is shown in FIG. 2D. The AMAM characteristic 207 has a characteristic that the gain of the power amplifier varies depending upon a power level of an input signal applied to the power amplifier. The AMAM distortion is also called an amplitude distortion. This can be removed of within a base band by digital processing, or can be removed of within an RF frequency band by an analog circuit. In this embodiment, a distortion adding section having an AMAM characteristic reverse to the AMAM characteristic 207 possessed by the power amplifier 109 is provided in a forward stage to the power amplifier, to previously add the input signal with a distortion thereby compensating for a distortion of the power amplifier 109.

The other cause to generate a nonlinear distortion in the power amplifier 109 is an AMPM characteristic. One example of this characteristic is shown in FIG. 2E. The AMPM characteristic has a characteristic that the phase of an output signal varies depending upon a level of power inputted to the power amplifier. The AMPM distortion is also called a phase distortion. Although this can be removed by base-band digital processing, removing within an RF frequency band by an analog circuit requires for a phase shifter to operate at high speed. For this reason, circuit configuration is more complicated as compared to removing of an AMAM characteristic. Similarly to AMAM characteristic distortional compensation, this embodiment provides a phase-distortion adding section having an AMPM characteristic reverse to the AMPM characteristic possessed by the power amplifier, in a forward stage to the power amplifier 109. By previously adding a phase distortion to an input signal, the phase distortion of the power amplifier is compensated for.

Accordingly, this embodiment provides amplitude-phase distortion adding sections 112 on an antenna array greater in weighting by an amplitude-phase control section 103, and amplitude distortion adding sections 15 on the other arrays, in order to implement beam control.

Figure 5:
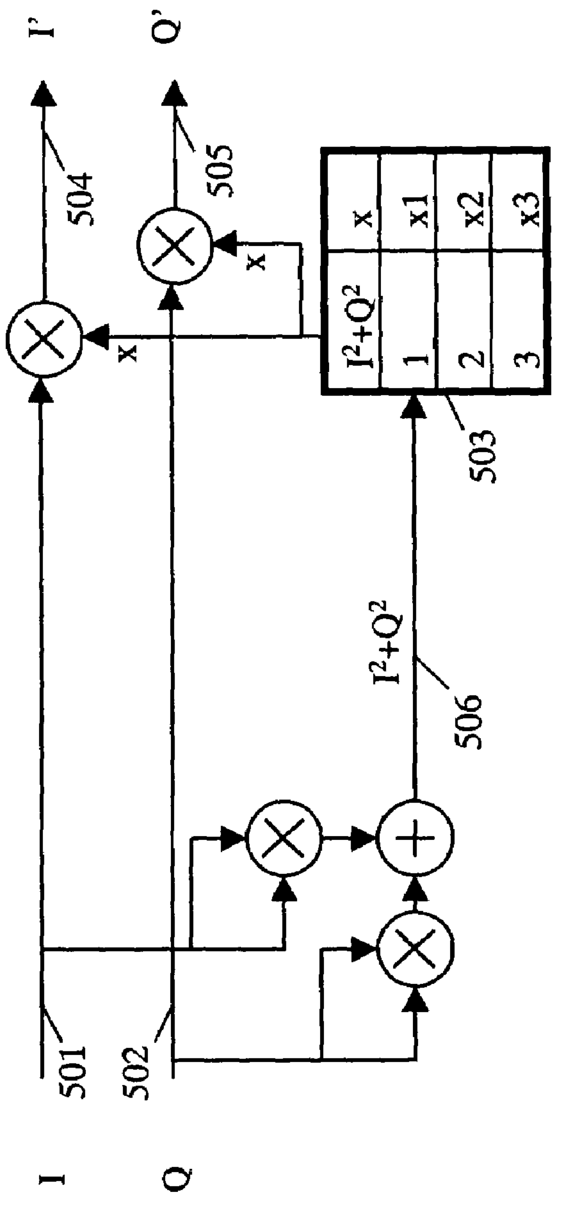
FIG. 5 is a configuration block diagram of an amplitude-distortion adding circuit in the first embodiment of the invention.

Herein, FIG. 5 shows an amplitude distortion adding section 411 configured with digital processing. In FIG. 5, an amplitude correction table 503 stores correction values X based on each power level. It is known that this can be obtained by previously measuring a distortion of a singular power amplifier to be used and compute a proper correction value by storing a previously computed correction value or feeding back an output signal of the power amplifier.

Now, explained is the operation of the amplitude distortion adding section 411 thus configured.

At first, the instantaneous power 506 of input signal is computed on an I signal 501 and Q signal 502.

Next, a correction value X suited for the power level is read out of the amplitude correction table 503.

Then, the correction value X is multiplied on the I signal and Q signal, thereby obtaining an I' signal 504 and Q' signal 505 added with an amplitude distortion.

Figure 15:
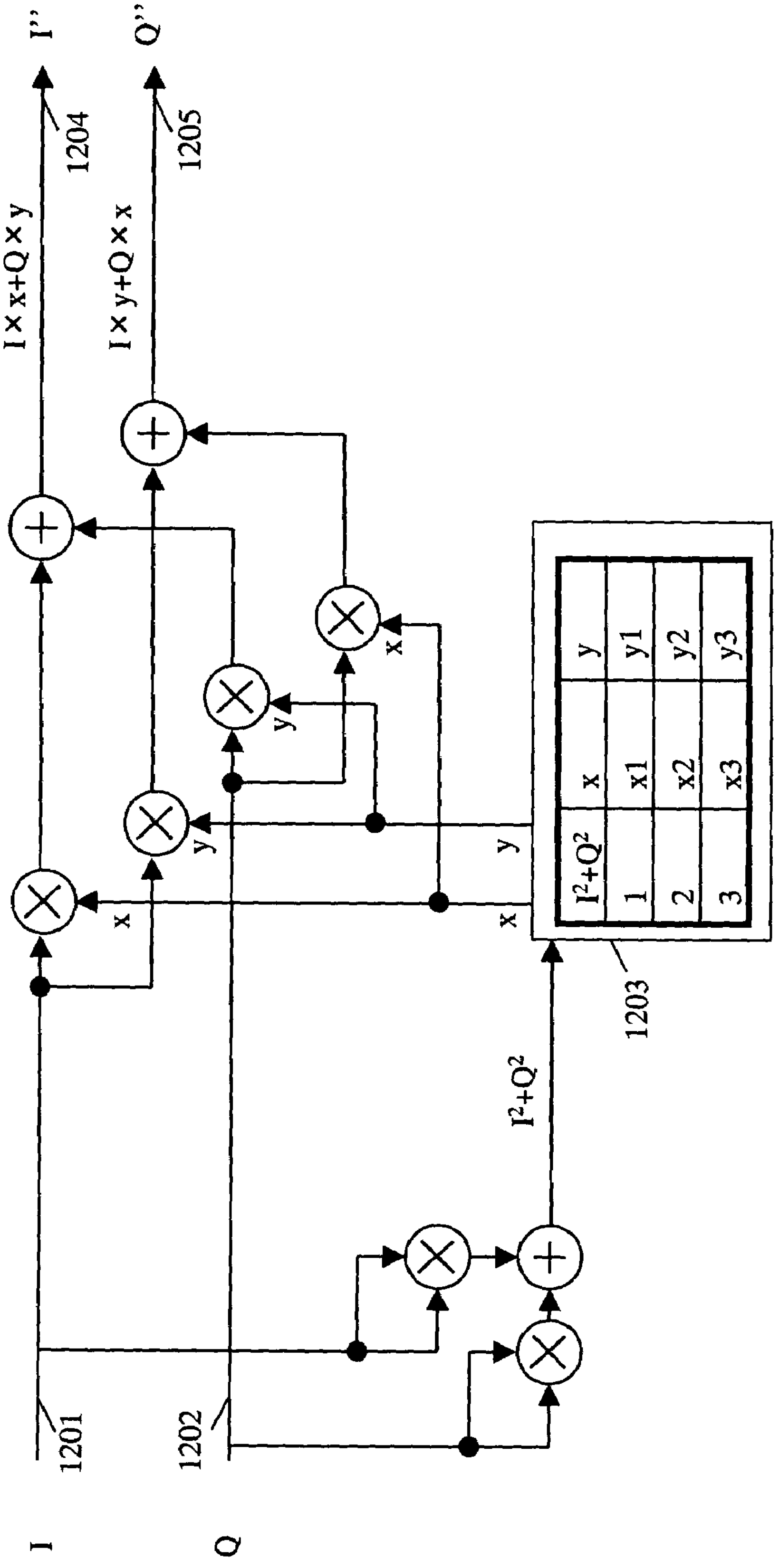
FIG. 15 is a configuration block diagram of a conventional amplitude-phase distortion adding section.
Figure 16:
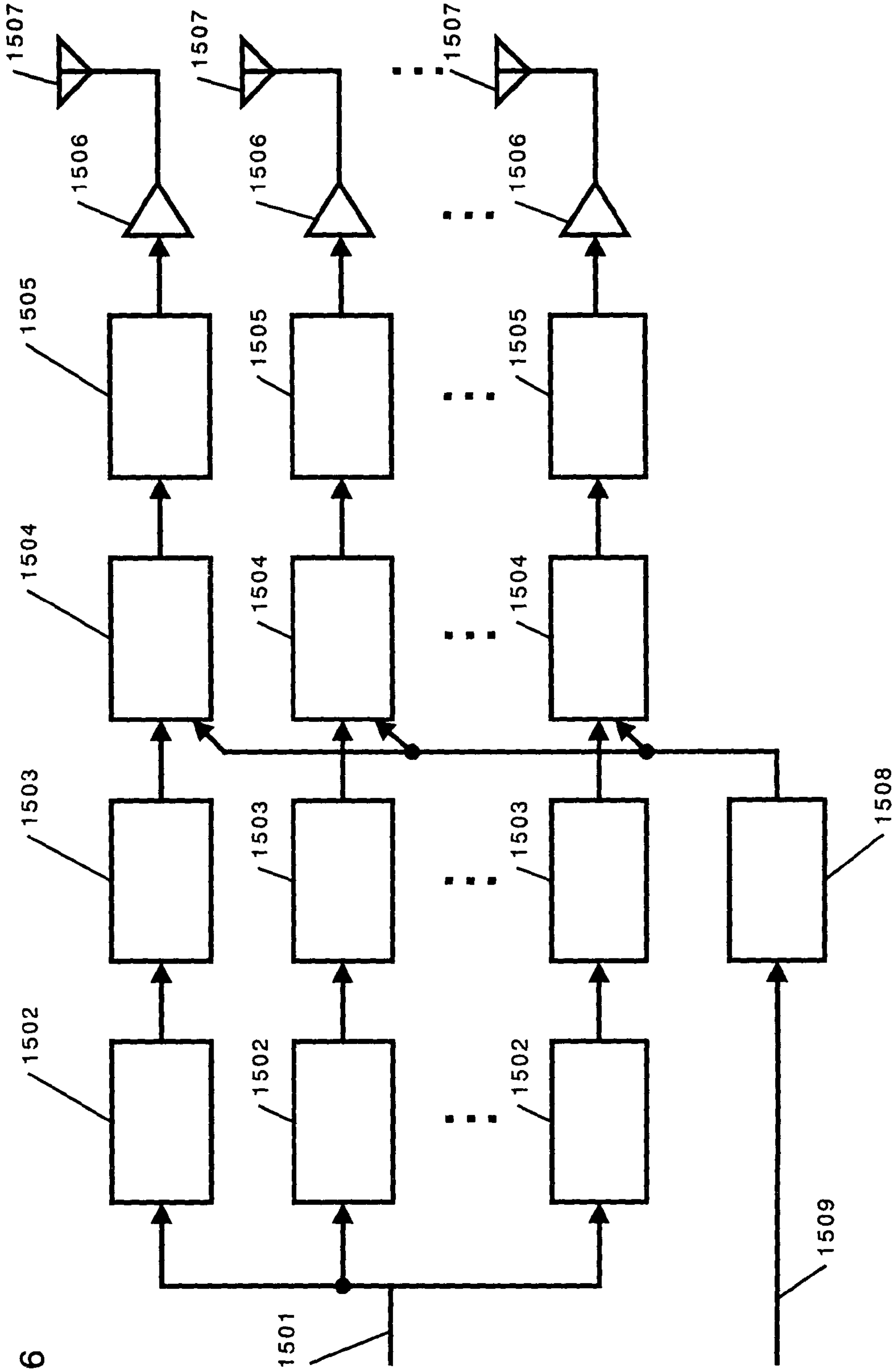
FIG. 16 is a configuration block diagram of a conventional array antenna apparatus.

Meanwhile, an amplitude-phase adding section 409 is the same in configuration as the showing in FIG. 15 explained in the related art.

Due to this, the antenna apparatus carries out compensation for distortion by a simple circuit as compared to the provision of amplitude-phase distortion adding sections 112 on all the antenna arrays, thereby improving the accuracy of beam control.

Now, explanation is made on the operation of the arrayed antenna of this embodiment, with using FIG. 1.

At first, the IQ signal 102 generated in the signal generating section 101, in the amplitude-phase control section 103, is subjected to amplitude weighting and phase rotation in order to obtain a predetermined beam, and outputted to the amplitude distortion adding section 105. Incidentally, the transmission IQ signal 102 is a QPSK signal for example, the same signal being transmitted onto the respective antenna arrays.

Then, the IQ signal 104 amplitude-weighted and phase-rotated, in the amplification-distortion adding section 105, is added by such a distortion as to cancel the amplitude distortion caused in the power amplifier 109, and outputted to the frequency converting section 107.

Then, the IQ signal 106 added with an amplitude distortion, in the frequency converting section 107, is orthogonally modulated and converted into a predetermined frequency.

Next, the RF signal 108 generated by the frequency converting section 107, in the power amplifier 109, is amplified up to a predetermined power level and radiated through the antenna 111.

On the other hand, on the central array of the linear array antenna, the IQ signal 116 amplitude-weighted and phase-rotated in the amplitude-phase distortion adding section 112 is added by such a distortion as to cancel the amplitude distortion and phase distortion caused by the power amplifier 118, and outputted to the frequency converting section 114.

Then, the IQ signal 113 added with an amplitude distortion and phase distortion is orthogonally modulated and further converted into a predetermined frequency.

Next, the RF signal 117 generated by the frequency converting section 114 is amplified, in the power amplifier 118, up to a desired power level, and radiated through the antenna 111.

In this manner, on the antenna array having the amplitude-phase control section 103 set for greater amplitude weighting, the power amplifier 118 is inputted by an input increased in level by average, to cause much more distortion as compared to the other power amplifier 109. Consequently, amplitude-phase distortion adding sections 112 are set up to compensate for both amplitude distortion and phase distortion. On the antenna array set for smaller amplitude weighting, the power inputted to the power amplifier 109 is low in level by average, to have less distortion as compared to the other power amplifier 118. Consequently, amplitude distortion adding sections 105 are set up to compensate only for amplitude distortion.

This is because, in the case the plurality of power amplifiers 109 possessed by the array antenna apparatus are equal in maximum output, the nonlinear distortion by the power amplifier is greater as the input level is higher and smaller as the input power level is lower. With this configuration, the nonlinear distortion on the transmission system is compensated for, realizing an array antenna apparatus high in beam control accuracy, small in circuit scale and low in power consumption.

Now, explanation is made on a result of measuring AMAM and AMPM characteristics of the power amplifier of this embodiment, to verify the effectiveness of this embodiment, in FIGS. 3 to 6.

Figure 3:
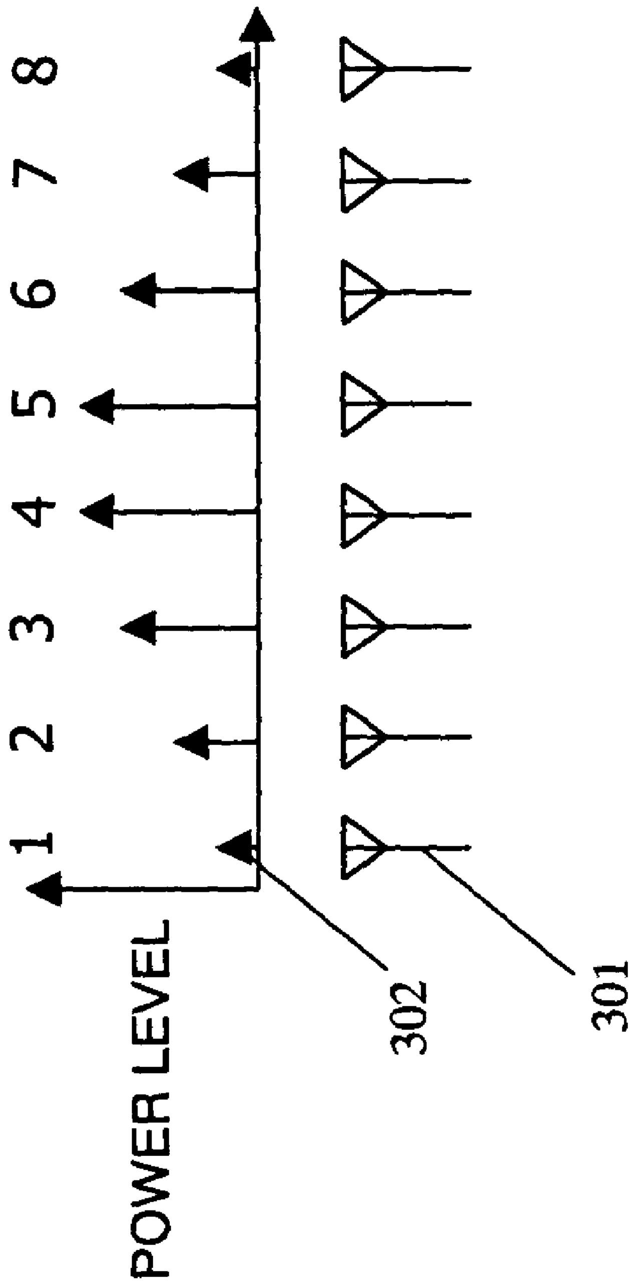
FIG. 3 is a diagram showing a power distribution based on the antenna array in the first embodiment of the invention.

FIG. 3 shows a distribution of the power assigned to the respective arrays when a beam is directed in a predetermined direction by using an 8-array linear array antenna.

In FIG. 3, 301 is a linear array antenna having 8 elements while 302 is a typical diagram of an averaged level of the power outputted at the array antennas.

In the case of beam control with amplitude-phase control by using a straight-line array antenna arrayed with antennas in line, amplitude weighting is generally given such that averaged power level is higher as the array is positioned closer to the center regardless of beam direction.

This results in a feature that, where the power amplifiers are equal in maximum output power, the caused distortion is greater as the power amplifier is positioned closer to the centered array.

FIG. 4 shows an arrangement diagram of a distortion compensator circuit for confirming the effectiveness of this embodiment.

Figure 4C:
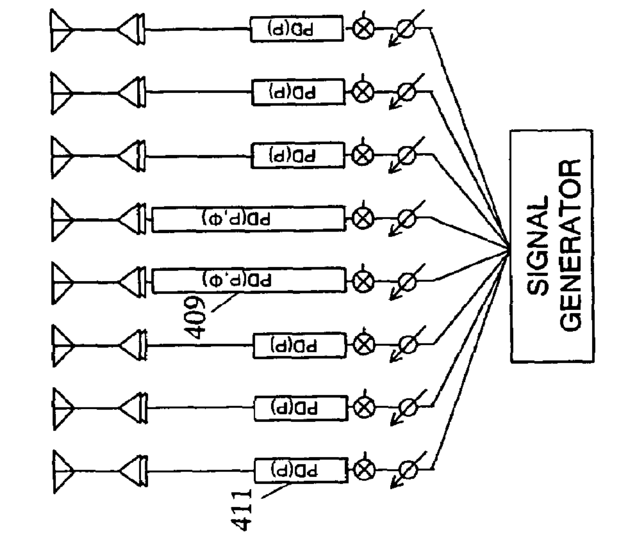
FIG. 4C is a configuration block diagram of the array antenna apparatus not having distortion compensation in the first embodiment of the invention.
Figure 4B:
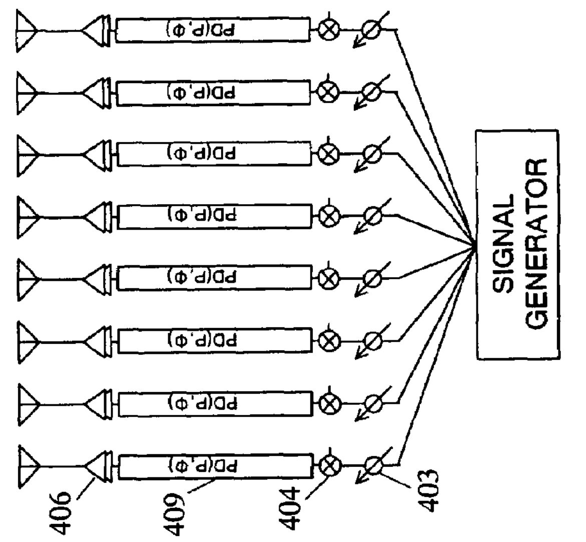
FIG. 4B is a configuration block diagram of a conventional array antenna apparatus having distortion compensation.
Figure 4A:
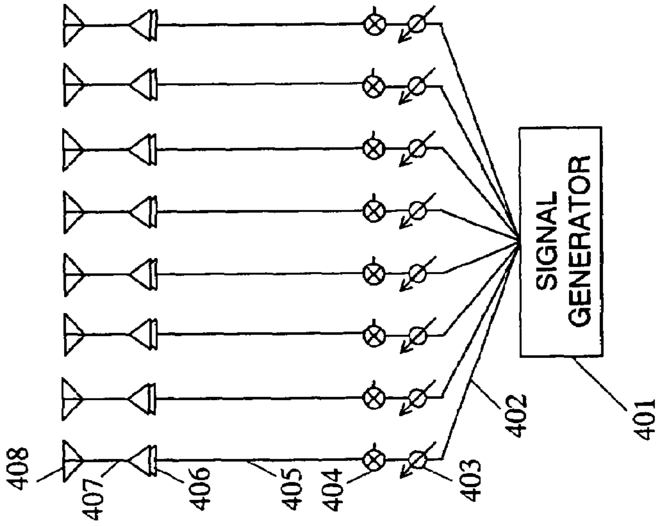
FIG. 4A is a configuration block diagram of a conventional array antenna apparatus not having distortion compensation.

FIG. 4A is a configuration diagram of an array antenna having no distortion compensator circuit.

In FIG. 4A, a signal generating section 401 outputs a generated signal 402 to respective antenna arrays.

A phase adjusting section 403 and amplitude adjusting section 404 inputs therein the generated signal 402, and adjusts a phase and amplitude such that the total antenna arrays form a desired beam, thereby outputting a transmission signal 405. A power amplifier 406 inputs therein the transmission signal 405, to output an amplified transmission signal 407.

An antenna section 408 inputs therein the amplified transmission signal 407, to send a radio wave.

FIG. 4B is a configuration diagram of an array antenna apparatus having a conventional distortion compensator circuit.

Herein, an amplitude-phase distortion adding section 409 is to add such an amplitude distortion and phase distortion as to cancel an amplitude distortion and phase distortion to be caused in the power amplifier 406, to the transmission signal generated by the phase adjusting section 403 and amplitude adjusting section 404. This is different from the array antenna apparatus shown in FIG. 4A in that the amplitude-phase distortion adding section 409 is provided on every antenna array.

FIG. 4C is a configuration diagram of an array antenna apparatus having a distortion compensator circuit of the present embodiment.

This is different from the array antenna apparatus shown in FIG. 4B in that an amplitude-phase distortion adding section 409 is provided only on the centered antenna arrays greater in power distribution whereas amplitude distortion adding sections 411 are provided on the other antenna arrays smaller in power distribution.

Figure 6:
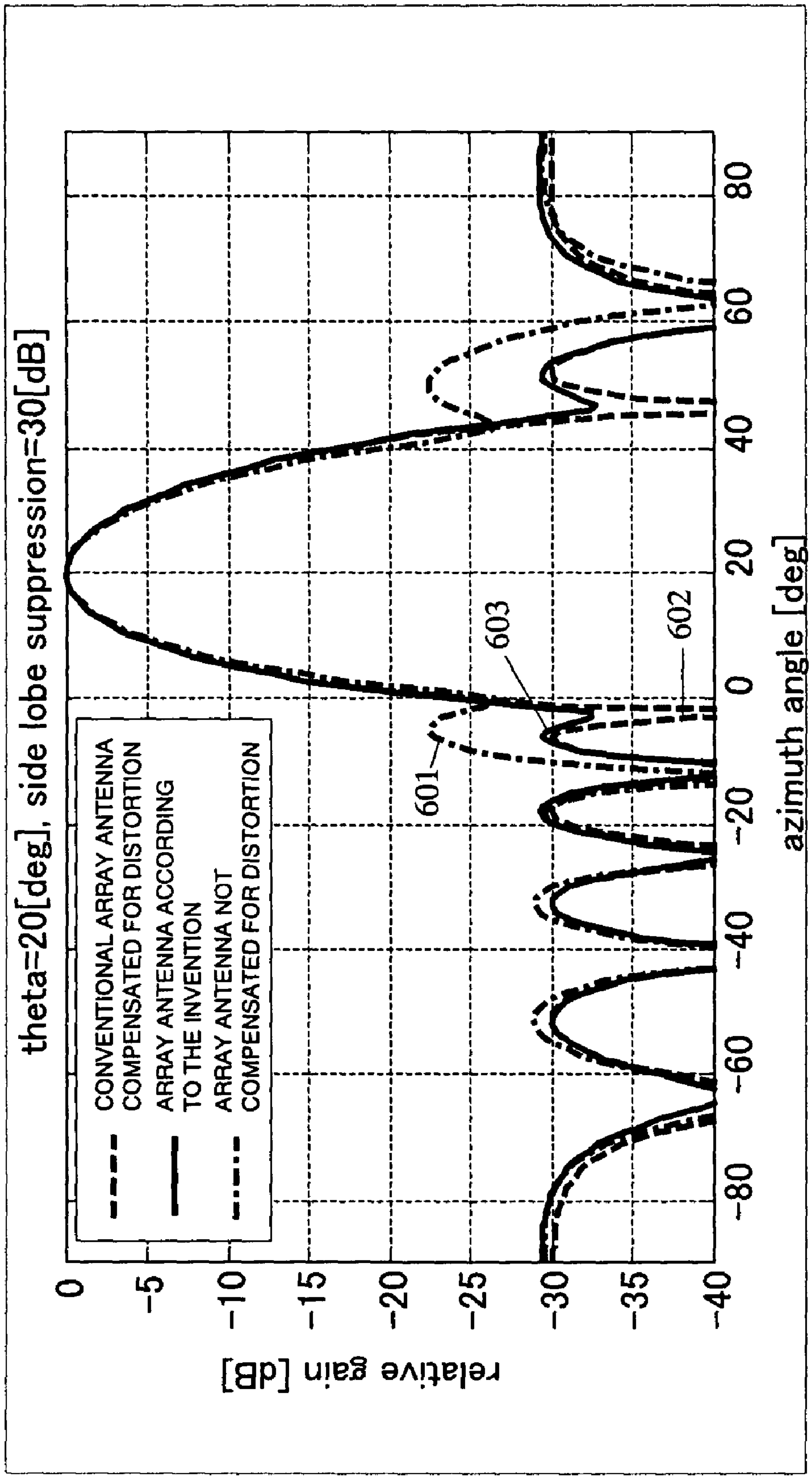
FIG. 6 is a figure showing a beam pattern computer analysis result.

FIG. 6 shows a beam pattern on the array antenna apparatus. 601 is a beam pattern on an array antenna apparatus not compensated for distortion shown in FIG. 4A, 602 is a beam pattern of a conventional array antenna apparatus compensated for distortion shown in FIG. 4B, and 603 is a beam pattern obtained by computer simulation of the array antenna apparatus of this embodiment shown in FIG. 4C. Incidentally, in the simulation, the array antenna apparatus of FIG. 4C has amplitude-phase distortion adding sections 409 connected on the two antenna arrays greatest in amplitude weight amount and amplitude distortion adding sections connected to the other arrays. How many amplitude-phase distortion adding sections 409 and amplitude distortion adding sections 411 are to be respectively connected was determined by simulating a beam deterioration amount in the case of changing the number, from which result computed was the number required to sufficiently suppressing the beam deterioration amount. In this manner, it is possible to determine a reference value (corresponding to a predetermined value of the invention) of an amplitude weighting amount for determining which one of an amplitude-phase distortion adding section 409 or an amplitude distortion adding section 411 is to be connected.

In FIG. 6, the beam pattern 602 because amplitude distortion and phase distortion are compensated for on every antenna array is a beam pattern removed of distortion of the power amplifier, exhibiting an ideal characteristic. Also, it can be seen that the beam pattern 601, because amplitude distortion and phase distortion are not compensated for on all the antenna arrays, is deteriorated in beam pattern due to the distortion occurring on the respective antenna arrays.

Meanwhile, comparing between the beam pattern 603 on the array antenna apparatus of this embodiment and the beam pattern 602 in the ideal characteristic, it can be seen that it is suppressed to 0.5 dB as compared at the first side lobe level. This is within an permissible range, in respect of array antenna beam control accuracy.

From this fact, the array antenna apparatus of this embodiment shown in FIG. 4C can be considered to obtain nearly equivalent beam control accuracy to that of the array antenna apparatus having distortion compensation circuits on all the antenna arrays.

On the other hand, explained are the below computation amounts of digital circuits in the both.

The amplitude distortion compensator circuit shown in FIG. 5 is to carry out integrations 4 times.

Meanwhile, the amplitude-phase distortion compensator circuit shown in FIG. 15 is to carry out integrations 6 times.

Accordingly, the conventional array antenna apparatus compensated for distortion shown in FIG. 4B is to carry out integrations 48 (=6×8) times in the overall because there are included 8 antenna arrays.

In contrast, the array antenna apparatus of this embodiment is to carry out integrations 36 (=6×2+4×6) times in the overall because the amplitude-phase distortion adding sections are connected on 2 arrays and the amplitude distortion adding sections are connected on 6 arrays.

In this manner, the array antenna apparatus of this embodiment can reduce the number of times of integrations while keeping the beam control accuracy nearly equivalent. Thus, the effectiveness of this embodiment can be made sure.

Meanwhile, in the array antenna apparatus of this embodiment, the digital circuit section 115 is reduced in configuration rather than that of the conventional array antenna apparatus having distortion compensator circuits on all the antenna arrays. Accordingly, the heat or current to be generated in digital circuit section 115 can be reduced, making it possible to realize the size reduction, power consumption reduction and cost reduction for the array antenna apparatus.

As described above, it is possible to improve power efficiency and reduce apparatus size, to form an accurate beam suppressed against beam control accuracy deterioration. Particularly, the effect is great where the variation in amplitude distortion is great as compared to that in the phase distortion commensurate with the instantaneous power of a signal inputted to the power amplifier.

Meanwhile, because the antenna array having a great power level to increase the effect of nonlinear distortion is compensated for both amplitude and phase while the array having not so great power level is compensated for one of them, distortion compensation is efficient in respect of power consumption and circuit scale. This provides a great effect where there is variation in magnitude of distortions occurring on each antenna array.

Furthermore, because the antenna array having a great nonlinear distortion is compensated for both amplitude and phase while the array small in nonlinear distortion is compensated for only one of those, distortion compensation is efficient in respect of power consumption and circuit scale. This provides a great effect where there is difference in maximum output power of the power amplifiers connected based on each antenna array or variation in magnitude of distortions caused.

Incidentally, this embodiment explained the example configuring the amplitude distortion adding section 105 by a digital circuit, the amplitude distortion adding section 105 can be realized by an analog circuit configured with amplifiers, resistances and the like. In this case, because only the amplitude-phase distortion adding section 112 is satisfactorily compensated for distortion by the digital circuit section 115, it is possible to reduce the number of times of integrations.

Meanwhile, the power amplifier 109 can be configured such that compensation is made by the amplitude-phase distortion adding section on the antenna array having a great input power level and having a great amplitude distortion and phase distortion while phase distortion adding sections are provided on the other antenna arrays where phase distortion rather than amplitude distortion is problematic. Also in this configuration, similar effects are obtainable.

Meanwhile, the arrangement of the amplitude distortion adding sections or amplitude-phase distortion adding sections is not limited to the configuration to provide those between the frequency converting section and the amplitude-phase control section. A part or the entire of the amplitude distortion adding sections or amplitude-phase distortion adding sections can be provided between the frequency converting section and the power amplifier or between the signal generating section and the amplitude-phase control section. In this case, there is a need to use an analog device having a response speed fallen within a RF-signal frequency band.

Meanwhile, there is a similar effect for a configuration having an antenna array neither provided with an amplitude-phase distortion adding section, amplitude distortion adding section nor phase distortion adding section, for the antenna array. This is because there can exist an antenna array that nonlinear distortion is not problematic in respect of the relationship between an input power level and a power amplifier. In such a case, it is possible to eliminate the connection of the distortion adding section to the antennal array.

Incidentally, although this embodiment explained the case where the number of antennas is eight on the array antenna, the number of antennas is not relied upon, i.e. a similar effect is obtainable on an array antennas configured two or more in the number.

Also, this embodiment explained to add amplitude-phase distortions on the central two antennas of a plurality of antenna arrays. In the case that weighting is made greater on the antenna array other than the central ones or so, an amplitude-phase distortion adding section may be structurally provided on the relevant antenna array greater in weighting, thereby obtaining a similar effect.

Also, although this embodiment explained the case that amplitude-weighting is given greater at the center of the eight antenna arrays, even if amplitude-weighting is not great at the center, a distortion compensator circuit may be provided mainly in an area where distortion caused by the power amplifier is great, thereby obtaining a similar effect.

Meanwhile, although this embodiment explained on the linear array antenna, there is a similar effect also on a circular array antenna or another form of antenna having a plurality of antenna arrays.

Furthermore, a radio communications apparatus including an array antenna of this embodiment can realize a radio communications apparatus efficient in respect of circuit scale and power consumption and excellent in beam controllability.

Embodiment 2

Figure 7:
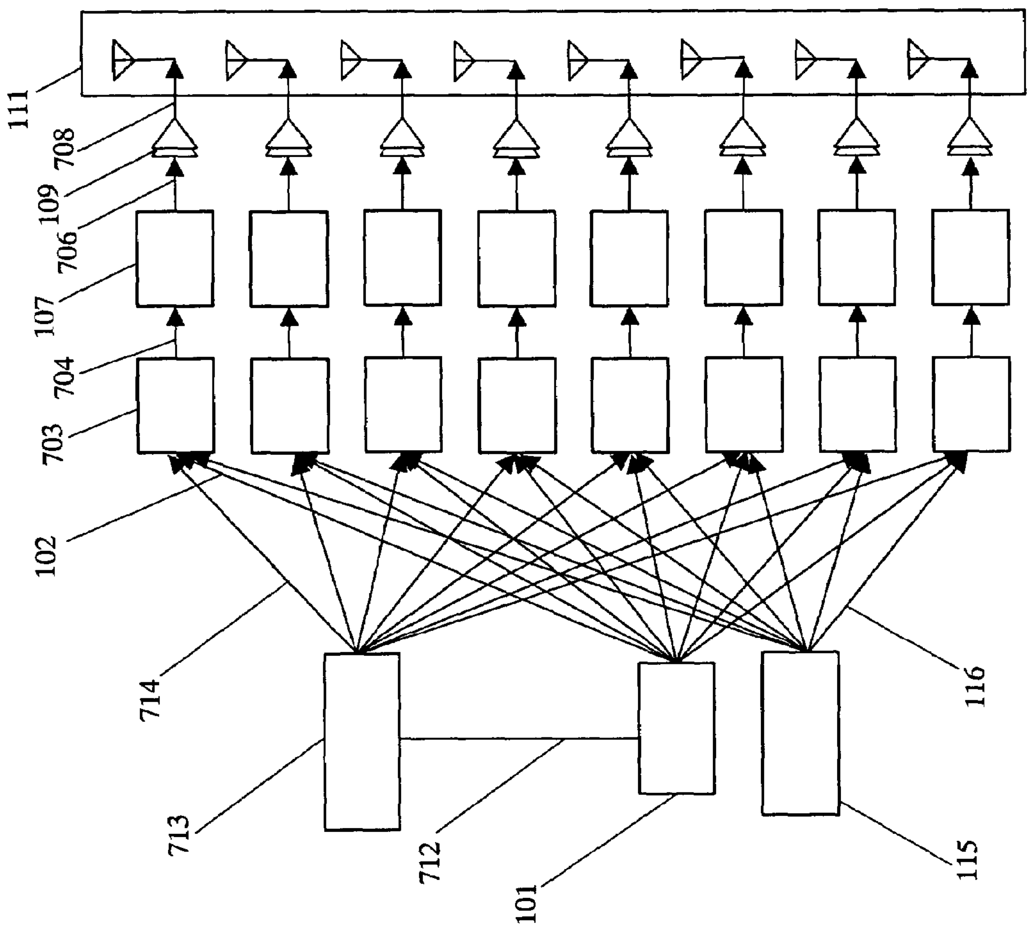
FIG. 7 is a configuration block diagram of an array antenna apparatus in a second embodiment of the invention.

FIG. 7 shows a configuration of an array antenna apparatus according to the present embodiment.

This is different from the configuration of embodiment 1 shown in FIG. 1, in that an instantaneous power computing section 713 is added and in that amplification-phase distortion adding sections 112 and amplification distortion adding sections 105 are not connected.

In FIG. 7, an instantaneous power level computing section 713 is to compute a power level of input signal and output an instantaneous power level signal 714 commensurate therewith.

Figure 8:
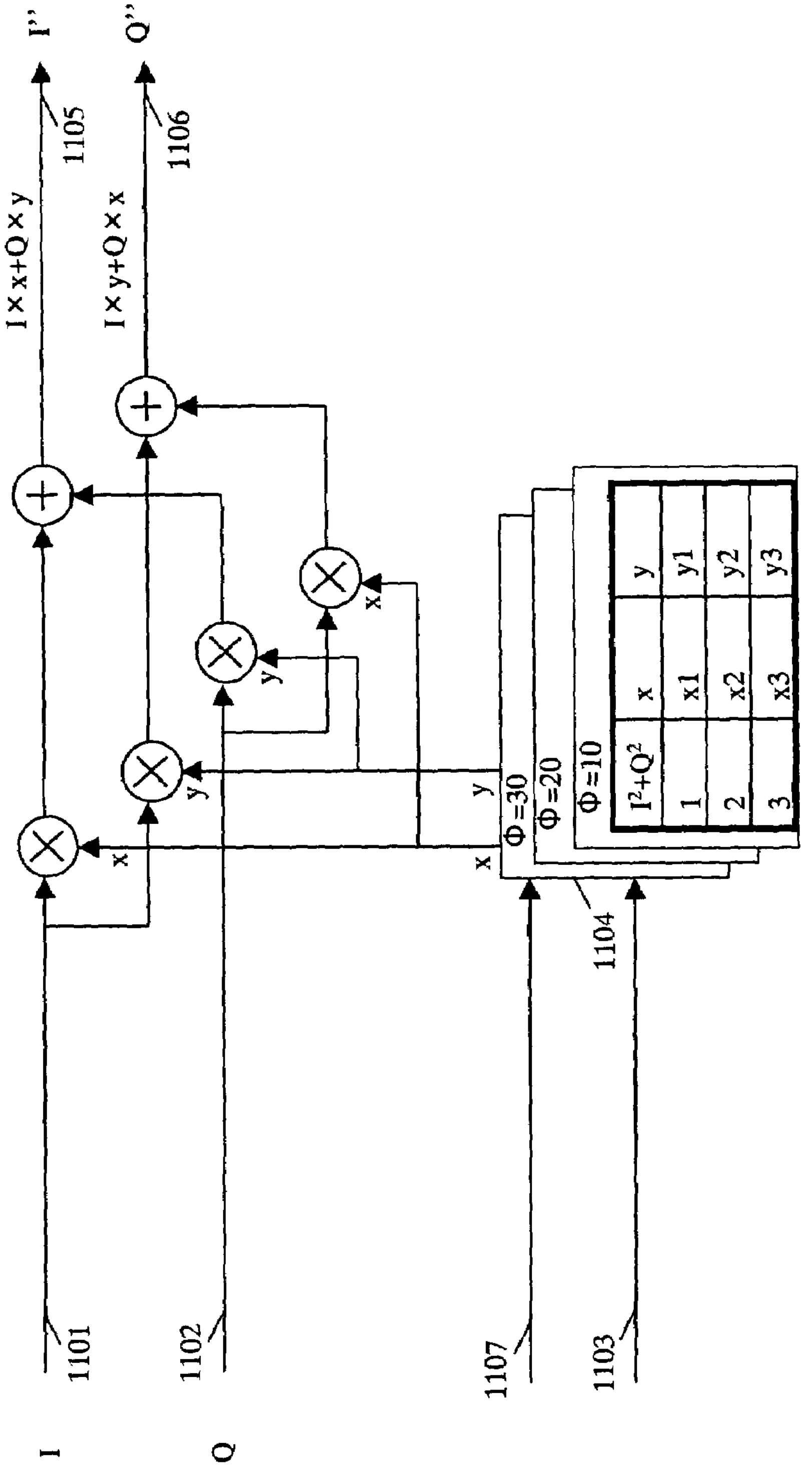
FIG. 8 is a configuration block diagram of an amplitude-phase control section in the second embodiment of the invention.

Also, an amplitude-phase control section 703 is different from the amplitude-phase control section 103 of embodiment 1 in that amplitude weighting and phase rotation are carried out depending upon not only a beam-direction control signal but also an instantaneous power level signal. FIG. 8 shows a configuration of the amplitude-phase control section of this embodiment.

In FIG. 8, the I signal 1101 and the Q signal 1102, inputted from a signal generating section 101, are respectively multiplied X and Y by multipliers, and thereafter added with each other, thus being converted into an I signal 1105 and Q signal 1106 controlled in amplitude and phase. Incidentally, correction coefficients X and Y are outputted from a correction table 1104 depending upon an instantaneous power level signal 1107 and beam-direction control signal 1103. The correction table 1104 can be determined by adding such a compensating coefficient as compensating for an amplitude distortion and phase distortion occurring in the power amplifier depending upon an instantaneous power level signal, to a coefficient of an amplitude weighting amount and phase rotation amount required for a beam-direction control signal.

Meanwhile, the correction table 1104 takes a configuration to change a read-out correction value depending upon two parameters of a beam-direction control signal 1103 and an instantaneous power level signal 1007 on input signal. By taking such a configuration, it is possible to simultaneously obtain two effects, i.e. amplitude weighting and phase rotation for forming a beam of an array antenna, and correction of a nonlinear distortion varying depending upon an instantaneous power.

The operation of the array antenna apparatus configured as above is explained with using FIGS. 7 and 8.

At first, the IQ signal generated by the signal generating section 101 is outputted to the amplitude-phase control sections 703 and to the instantaneous power level computing section 712.

Next, from the IQ signal inputted to the instantaneous power level computing section 713, an instantaneous power level thereof is computed. The instantaneous power level signal 714 is outputted to the amplitude-phase control sections 703 of the respective antenna array.

Meanwhile, the beam-direction control section 115 outputs a beam-direction control signal 116 to the amplitude-phase control section 703 such that the radio wave outputted at the antenna 111 forms a desired beam.

Then, the IQ signal 102 in the amplitude-phase control section 103 is amplitude-weighted and phase-rotated correspondingly to the instantaneous power level signal 714 and beam-direction control signal 116 in order to obtain a desired beam, and outputted to the frequency converting section 107.

Then, the IQ signal 704 amplitude-weighted and phase-rotated is orthogonally modulated in the frequency converting section 107, and further frequency-converted into a desired frequency.

Then, the RF signal 706 generated in the frequency converting section 107, in the power amplifier 109, is amplified to a desired power level and radiated as a radio wave through the antenna 111.

In this manner, the amplitude phase control section 703 compensates for amplitude and phase distortion depending upon an instantaneous power level signal and beam-direction control signal, simultaneously with computing its weighting. This makes it possible to carry out beam control that is simple in distortion-compensator circuit configuration and favorable in accuracy.

Namely, because all the corrections according to an instantaneous power level are made in the amplitude-phase control sections of the respective antenna arrays, it is possible to improve power efficiency and reduce apparatus size, to form an accurate beam suppressed against beam control accuracy deterioration. Particularly, this is highly effective where antenna arrays are many in the number.

Meanwhile, in this embodiment, correction is carried out based on the correction table including a nonlinear distortion compensation, due to the power amplifier, to be designated by an instantaneous power level by the instantaneous power level computing section and a beam-direction control signal to designate a beam direction to the amplitude-phase control section. Due to this, because the nonlinear distortion compensation according to an instantaneous power level is made simultaneously with beam control, efficiency is improved in respect of circuit scale and power consumption.

Incidentally, this embodiment explained the case to change the amplitude weighting amount and phase rotation amount on all the antenna arrays depending upon an input IQ signal power level. However, in accordance with a degree of amplitude distortion or phase distortion, any one or both of amplitude weighting amount and phase rotation amount can be changed on part of the antenna arrays depending upon an input IQ signal power level.

Also, although this embodiment explained the configuration having one instantaneous power level computing section 713, this is not limited to. In each antenna array, the amplitude-phase control section may have a function to compute an instantaneous power level, to simultaneously carry out beam control and distortion compensation.

Incidentally, although this embodiment explained the case that the number of antennas was eight in the array antenna. However, this is not limited to. A similar effect is obtainable with an array antenna apparatus structured by two or more antennas.

Furthermore, a radio communications apparatus including an array antenna apparatus of this embodiment can realize a radio communications apparatus that is efficient in respect of circuit scale and consumption power and excellent in beam controllability.

Embodiment 3

Figure 9:
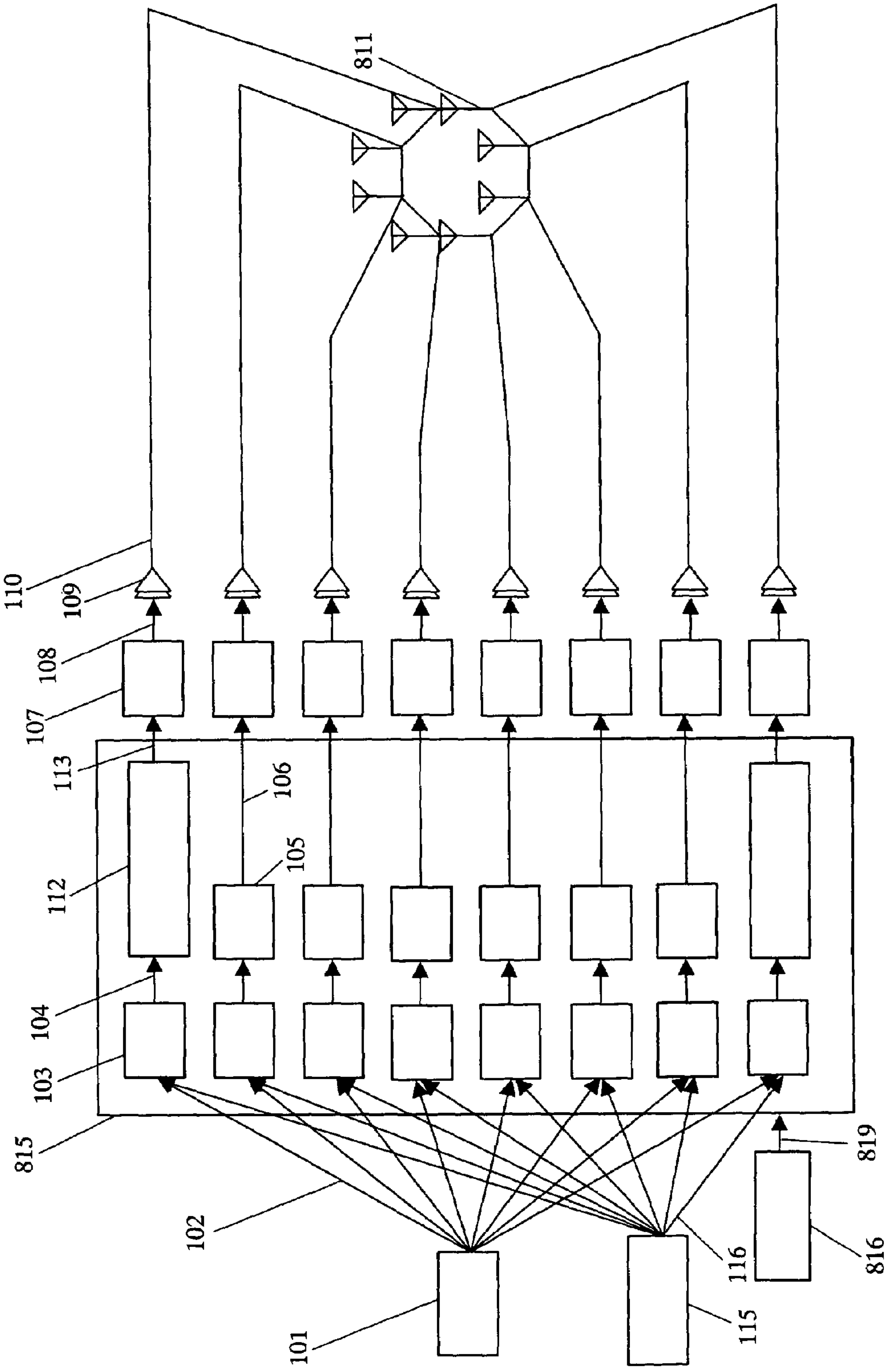
FIG. 9 is a configuration block diagram of an array antenna apparatus in a third embodiment of the invention.

FIG. 9 shows a configuration of a circular array antenna apparatus according to the present embodiment. This is different from the configuration of embodiment 1 shown in FIG. 1 in that a rewrite control section 816 is added, an amplitude-phase control section 103, amplitude-phase distortion adding section 112 and amplitude distortion adding section 805 are configured by a reconfigurable device (rewritable circuit) that is a device capable of circuit-rewriting, and the array antenna is of a circular array antenna.

In FIG. 9, the amplitude-phase control sections 103, the amplitude distortion adding sections 105 and the amplitude-phase distortion adding sections 112 are included in a digital processing section 815. This digital processing section 815 is a circuit rewritable device, one example of which is in practical application as SDR (Software defined radio). The digital processing section 815 makes a rewriting, based on each antenna array, into a combination of amplitude-phase control section 103 and amplitude-phase distortion adding section 112 or amplitude-phase control section 103 and amplitude distortion adding section 105, according to an external write control signal 819.

Meanwhile, the rewrite control section 816 controls the digital processing section 815, i.e. outputs a rewrite control signal 819 to the digital processing section 815, to arrange the amplification-phase distortion adding section 103 and the amplification distortion adding section 105 in proper positions. Now, explained is the operation of the array antenna apparatus.

At first, in order to form the total radiation pattern of the 8-arrayed circular antenna 811 to a desired form, the beam-direction control section 115 determines amplitude weighting amounts and phase rotation amounts suited for the respective antennas, and outputs a beam-direction control signal 116 to the amplitude-phase control sections 103 of the respective antenna arrays. Due to this, selected is a coefficient X, Y shown in FIG. 11 of the amplitude-phase control section 103.

Also, the rewrite control section 816 arranges the amplitude-phase distortion adding section 112 and amplitude distortion adding section 105 depending on a direction of beam control, according to the rewrite control signal 819.

Then, the transmission signal 102 generated in the signal generating section 101, in the amplitude-phase control section 103, is amplitude-weighted and phase-rotated by the use of the selected coefficient X, Y, and outputted to the amplitude distortion adding section 105 or amplitude-phase distortion adding section 112.

Next, the transmission signal 104 amplitude-weighted and phase-rotated, in the amplitude distortion adding section 105, is computed with an instantaneous power level and added by such a distortion as to cancel an amplitude distortion caused in the power amplifier 109, being outputted to the frequency converting section 107.

Meanwhile, the transmission signal 104 inputted to the amplitude-phase distortion adding section 112 is similarly computed with an instantaneous power level and added by such a distortion as to cancel an amplitude distortion and a phase distortion caused in the power amplifier 109, being outputted to the frequency converting section 114.

Then, the signal 106, 113 added with the distortions, in the frequency converting section 107, is orthogonally modulated and further converted into a desired frequency.

Next, the RF signal 108 generated in the frequency converting section 107, in the power amplifier 109, is amplified up to a desired power level and radiated through the circular array antenna 811.

As described above, this embodiment is structured to rewrite the positions of the amplitude-phase distortion adding section 112 and amplitude distortion adding section 105 according to a direction of beam control. This makes it possible to readily carry out a suitable compensation for distortion when to change the beam direction. Also, with this structure, an amplitude-phase distortion adding section can be adaptively provided on the array greater in occurring distortion, in a circular array antenna having amplitude weighting varying based on each antenna array, according to a beam direction. Accordingly, the digital processing section 815 can be reduced in operation amount, making it possible to obtain an accurate beam control on a small process amount.

Namely, each time of setting an amplitude weight amount and phase rotation amount, the distortion adding part on each antenna array can be switched to an optimal one. It is possible to form a beam accurate in beam control by suppressing the deterioration in beam control accuracy. Particularly, this is effective where the amplitude weighting amount varies in time on each antenna array.

Meanwhile, rewriting the circuit configuration of reconfigurable device is switching between an antenna array on which an amplitude-phase distortion adding circuit exists to compensate for a nonlinear distortion of amplitude and phase to occur in a power amplifier and an antenna array on which any one exists of an amplitude distortion adding circuit for compensating for a nonlinear distortion of amplitude to occur in a power amplifier and a phase distortion adding section for compensating for a nonlinear distortion of phase. Due to this, each time of setting an amplitude weighting amount and phase rotation amount, the distortion adding section of each antenna array can be switched to an amplitude-phase distortion adding circuit or the like. It is possible to improve power efficiency and reduce apparatus size, to form an accurate beam suppressed against beam control accuracy deterioration.

Incidentally, although this embodiment showed the example configured by a circuit reconfigurable device, this is not limited to. A similar effect is obtainable on an array antenna apparatus having a line switching function as shown in FIG. 10.

Figure 10:
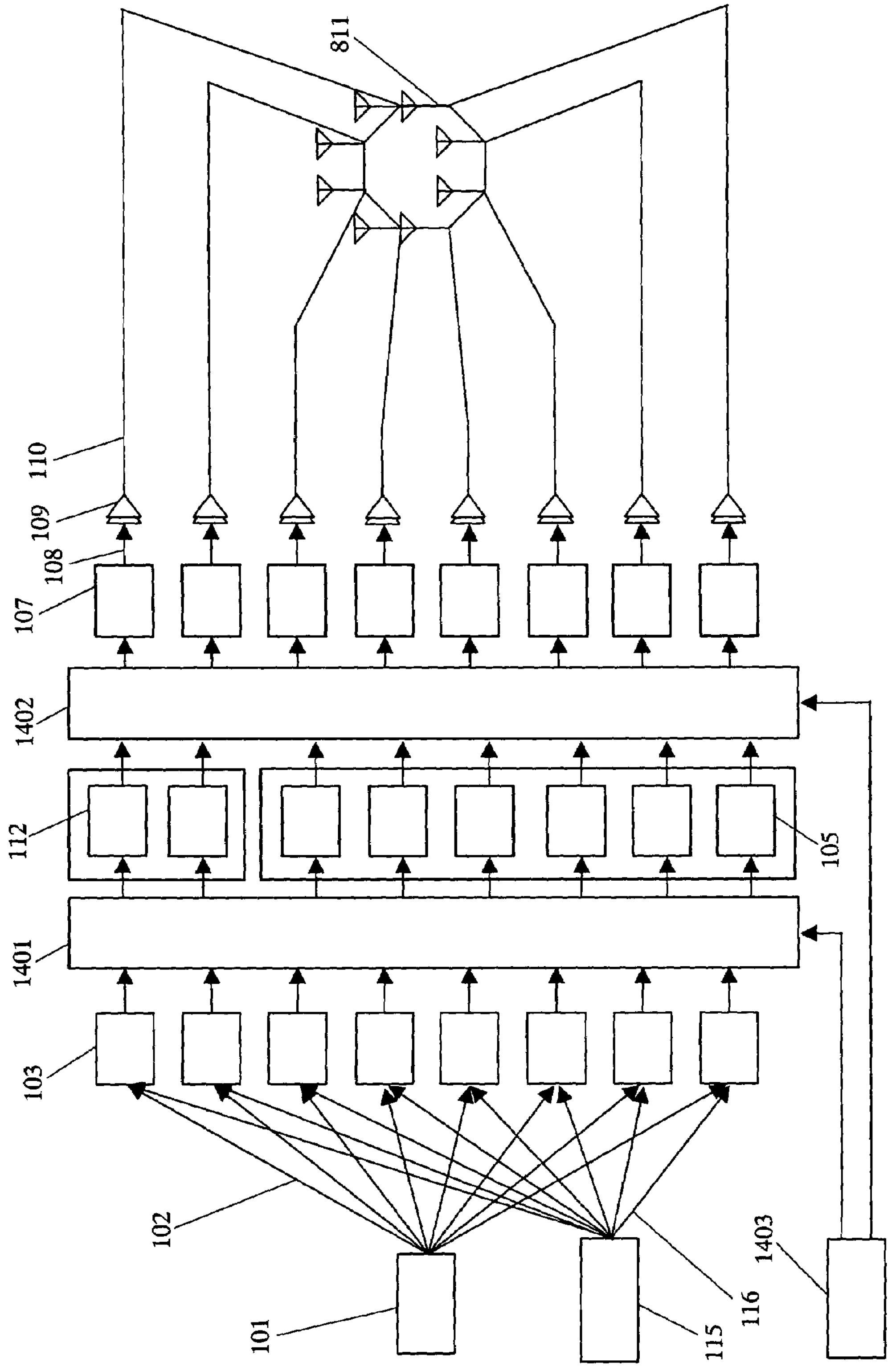
FIG. 10 is a configuration block diagram of an array antenna apparatus in the third embodiment of the invention.

In FIG. 10, a first line switching section 1401 is provided between the amplitude-phase control sections 103 and the amplitude distortion adding sections 105 or between the amplitude-phase control sections 103 and the amplitude-phase distortion adding sections 112. Also, a second line switching section 1402 is provided between the amplitude distortion adding sections 105 or amplitude-phase distortion adding sections 112 and the frequency converting sections 107. The switch control section 1403 controls the first line switching section 1401 and second line switching section 1402 so that the amplitude-phase distortion adding section 103 and amplitude distortion adding section 805 can be connected with the amplitude-phase control section 103 and frequency converting section 107 according to a direction of beam control.

In this manner, by switching the antenna array to connect between the amplitude distortion adding section 105 and the amplitude-phase distortion adding section 112, it is possible to obtain an effect similar to that of the array antenna apparatus configured shown in FIG. 9.

Incidentally, although this embodiment explained the case that an amplitude-phase distortion adding section 112 or amplitude distortion adding section 105 is provided on every antenna array, it is possible to configure an antenna array neither including an amplitude-phase distortion adding section 112 nor amplitude distortion adding section 105.

Also, although this embodiment explained the case where the number of antenna is eight on the circular array antenna, this is not limited to, i.e. a similar effect is obtainable on an array antenna apparatus configured with two or more antennas in the number.

Also, in the case of the circular array antenna of this embodiment, the effect is particularly great because, when changing the transmission beam direction, changed is the amplitude weighting amount of each antenna array. However, without limited to the circular array antenna, a similar effect is obtainable on an antenna, e.g. a straight array antenna or an array antenna having a plurality of antenna arrays, having a suitable power distribution provided to the antenna arrays to be changed, by changing a desired beam direction.

Figure 12:
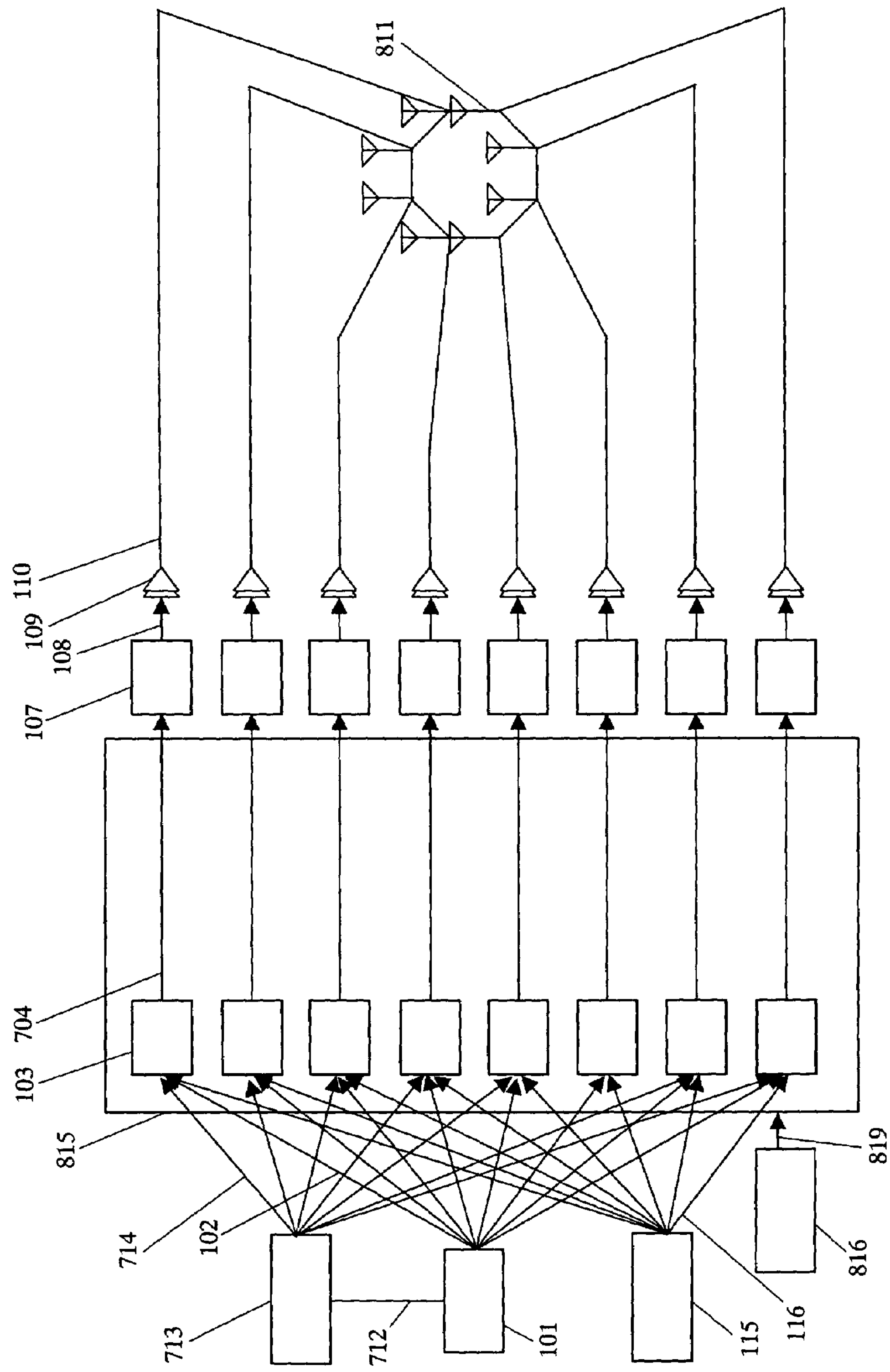
FIG. 12 is a configuration block diagram of an array antenna apparatus in the third embodiment of the invention.
Figure 13:
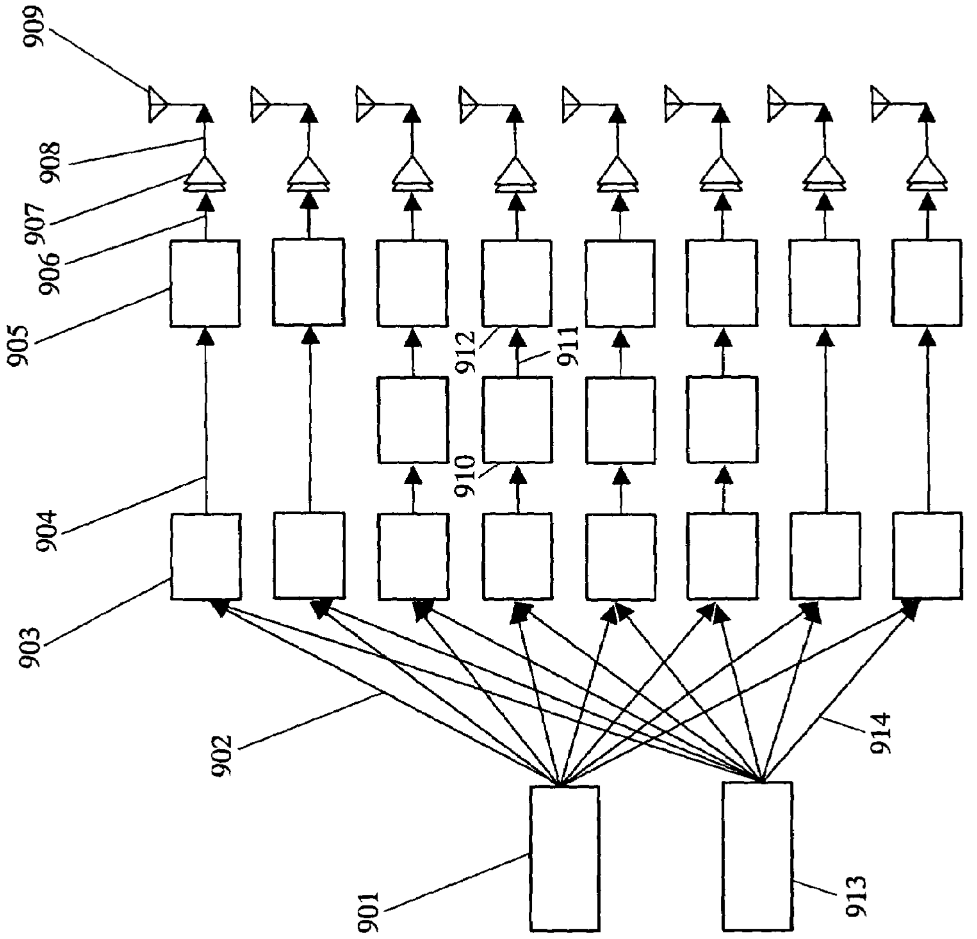
FIG. 13 is a configuration block diagram of a conventional array antenna apparatus.

Also, although this embodiment explained the case that the amplitude-phase control section, the amplitude-phase distortion adding section and the amplitude distortion adding section exist separately, realization is possible by integrating the amplitude-phase control section and the amplitude-phase distortion adding section or amplitude distortion adding section into one as in FIG. 12, and by configuring the amplitude-phase control section 103 as in FIG. 8. In this case, a similar effect is obtainable.

Furthermore, a radio communications apparatus including an array antenna apparatus of this embodiment can realize a radio communications apparatus efficient in respect of circuit scale and power consumption and excellent in beam controllability.

Embodiment 4

Figure 11:
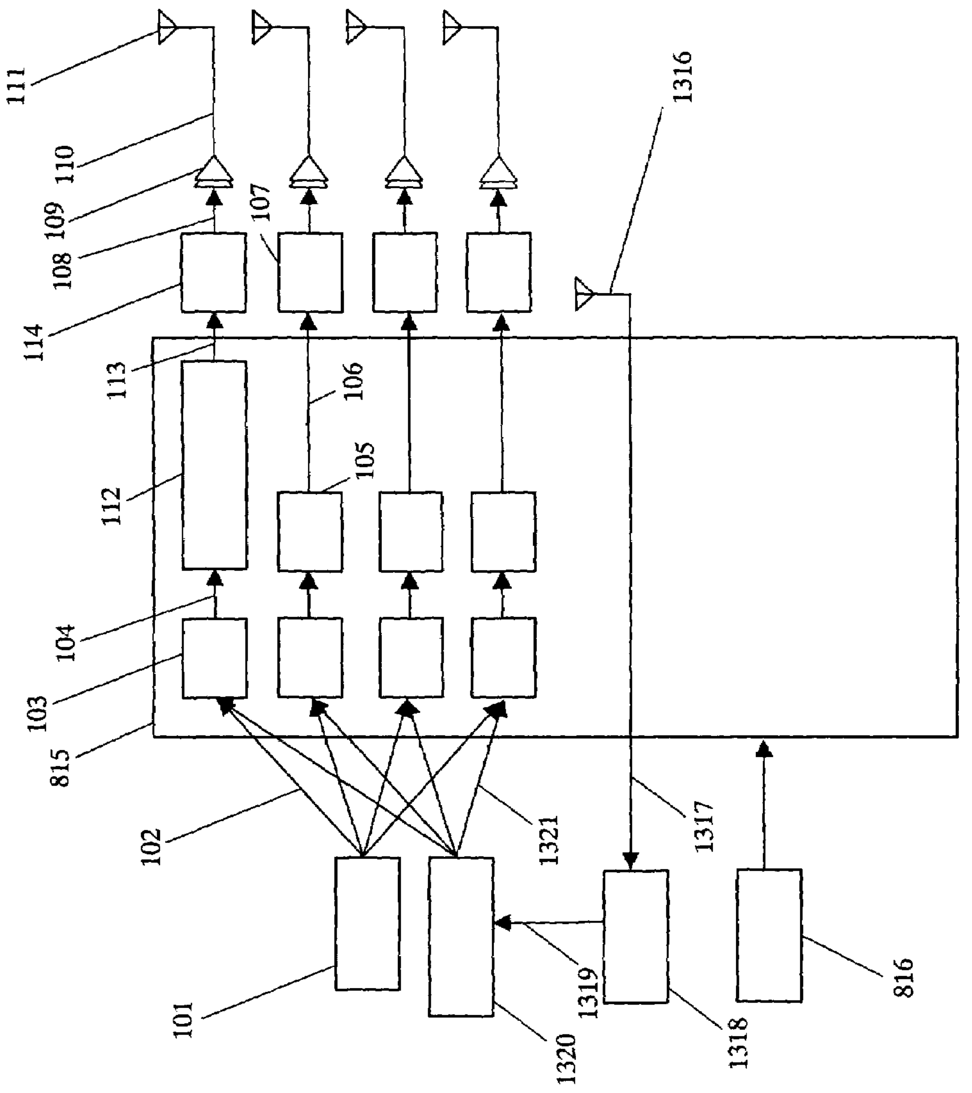
FIG. 11 is a configuration block diagram of a MIMO communications apparatus in a fourth embodiment of the invention.

FIG. 11 shows a configuration of a MIMO communication apparatus according to the present embodiment.

In FIG. 11, a propagation environment information receiving section 1318 is to output a propagation environment reference signal 1319 from a propagation environment signal 1317 received at a reception antenna 1316. The propagation environment signal 1317 is to notify a state of propagation channels for transmission at a transmission antenna 1311.

An amplitude-phase weighting determining section 1320 computes an amplitude weighting amount and phase rotation amount on each antenna array on the basis of a propagation environment reference signal 1319, and outputs an amplitude-phase control signal 1321 to the amplitude-phase control section 1303.

The other signal generating section 101, amplitude-phase control section 103, amplitude distortion adding section 105, frequency converting section 107, power amplifier 109, antenna section 1311, amplitude-phase distortion adding section 112 and frequency converting section 107 are the same in configuration as those of embodiment 3. Also, a digital processing section 815 having the amplitude phase control section 103, amplitude distortion adding section 105 and amplitude-phase distortion adding section 112 is the same in configuration as that of embodiment 3, while a rewrite control section 816 for controlling the same is also the same in configuration as that of embodiment 3.

Figure 14:
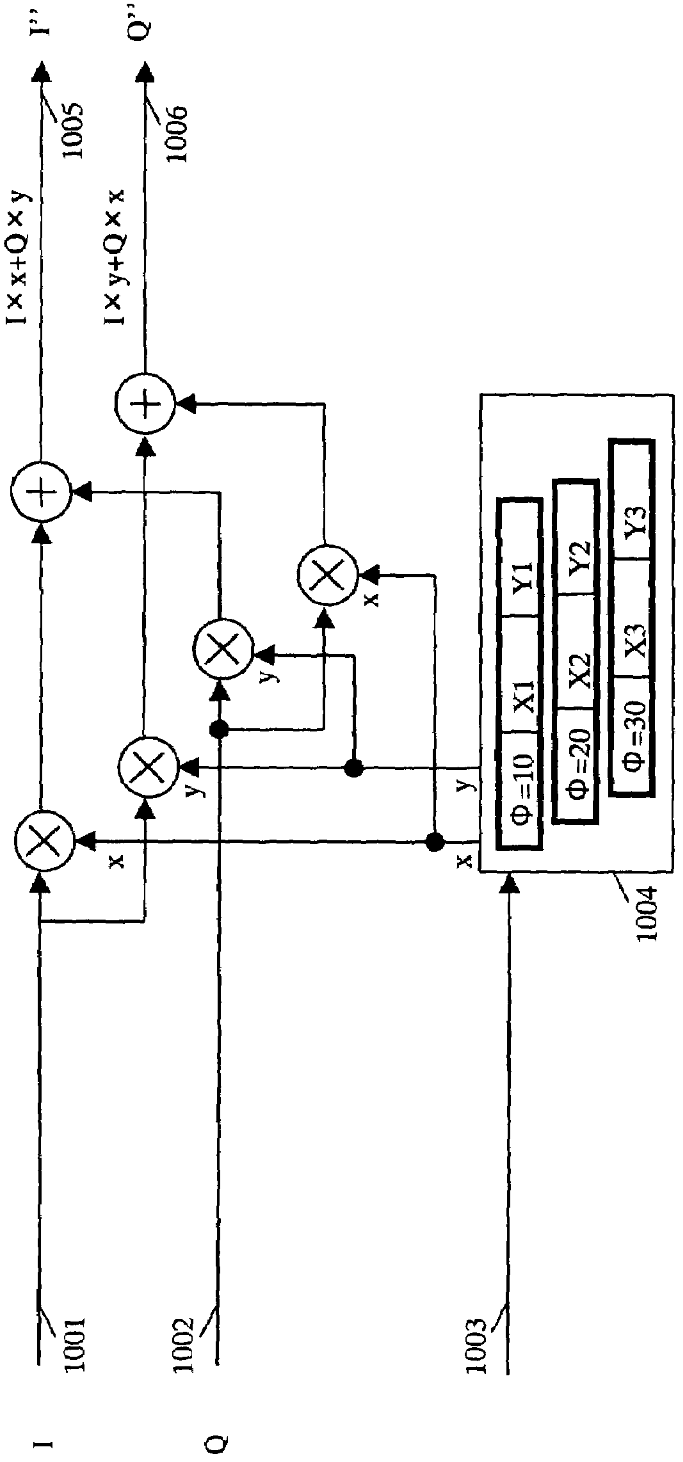
FIG. 14 is a configuration block diagram of a conventional amplitude-phase control section.

Incidentally, the amplitude-phase control section 103 is of the same configuration as the conventional amplitude-phase control section shown in FIG. 14, which selects a coefficient X, Y from a correction value table 1004, on the basis of an amplitude-phase control signal 1321 in place of the beam direction control signal 1003. The correction value table 1004 in this case can be determined by previously measuring a distortion of a single power amplifier and saving a previously computed correction value or by feeding back an output signal of the power amplifier and computing a suitable correction value.

Now, explanation is made on the operation of the arrayed antenna apparatus configured as above.

At first, the transmission signal 102 generated in the signal generating section 101, in the amplitude-phase control section 103, is amplitude-weighted and phase-rotated, and then outputted to the amplitude distortion adding section 105.

Next, the transmission signal 104 amplitude-weighted and phase-rotated, in the amplitude distortion adding section 105, is computed with an instantaneous power level of signal 104. The input signal 104 is added by such a distortion as to cancel an amplitude distortion caused in the power amplifier 109. Meanwhile, the transmission signal 104, in the amplitude-phase distortion adding section 112, is computed with an instantaneous power level. The signal 104 is added by such a distortion as to cancel an amplitude distortion and a phase distortion caused in the power amplifier 109.

Then, the signal 106 added with the distortion, in the frequency converting section 107, is orthogonally modulated and converted into a desired frequency.

Meanwhile, the signal 113 added with the amplitude distortion and phase distortion, in the frequency converting section 114, is orthogonally modulated and converted into a desired frequency.

Next, the RF signal 108 generated in the frequency converting section 107, 114, in the power amplifier 109, is amplified up to a desired power level and radiated through the antenna 111.

Then, a not-shown receiver receives the signal sent from the antenna 111, to detect a state of its propagation channel. Then, the receiver sends a propagation environment signal 1319 containing a signal notifying in what state the signal sent at the antenna 111 has been received, to the relevant MIMO communication apparatus. As a result, on the basis of the propagation environment signal 1319 received by the reception antenna 1316, a transmission-path information receiving section 1318 computes respective states of propagation channels for transmission through four antennas 111. Then, the propagation environment reference signal 1319 is outputted from the transmission-path information receiving section 1318.

Next, the amplitude-phase weighting determining section 1320 estimates a propagation environment of each channel comprising each transmission antenna 111 and a reception antenna of the receiver to receive a signal sent at the transmission antenna 111, to compute a weight amount with amplitude and a rotation amount of phase based on each antenna array thereby outputting an amplitude-phase control signal 1321.

Then, the rewrite control section 816 controls the digital processing section 815 similarly to embodiment 3, to make a rewriting such that the amplitude-phase distortion adding section 112 and amplitude distortion adding section 105 are adaptively arranged for the amplitude weighting amount based on each antenna array.

As described above, in the case of implementing MIMO communications with the use of an array antenna having 4 elements, in order to improve communication quality in a radio wave environment of communication path varying in time, there is a need to change in time the power levels of outputs at respective antenna arrays, i.e. amplitude weighting amount. In this case, by reconfiguring the positions of the amplitude-phase distortion adding section 112 and amplitude distortion adding section 105 responsive to a change of amplitude weighting amount on the antenna array, even when transmission output is changed depending upon a change of radio wave environment, change is possible to the corresponding distortion compensator circuit configuration. This can cope with the radio wave environment, to suppress low the influence of nonlinear distortion. Furthermore, circuit configuration can be simplified wherein the digital processing section 815 is reduced in operation amount. Thus, a MIMO communication apparatus can be realized which is improved in power efficiency, reduced in apparatus size, suppressed against communication quality deterioration and high in communication quality.

Incidentally, although the embodiments explained the case that an amplitude-phase distortion adding section or amplitude distortion adding section is provided on every antenna array, it is possible to make an antenna array neither including amplitude-phase distortion adding section nor amplitude distortion adding section in accordance with a degree of amplitude or phase distortion.

Meanwhile, although the embodiment explained the case having 4 antennas, this is not limited to, i.e. a similar effect is obtainable on a MIMI communication apparatus configured with two or more antennas.

As described above, the array antenna apparatus of the present invention reduces the size of a circuit configuration for compensation for a nonlinear distortion on a transmission system, thus improving the efficiency of power consumption.

What is claimed:

1. An array antenna apparatus comprising:

a plurality of antenna elements;

power amplifiers respectively connected to the plurality of antenna elements;

an amplitude phase distortion adding section positioned on at least any of a plurality of antenna arrays having the antenna elements and power amplifiers, to compensate for a nonlinear distortion in amplitude and phase occurring in the power amplifier;

any one of an amplitude distortion adding section for compensating for an amplitude nonlinear distortion, occurring in the power amplifier, and a phase distortion adding section for compensating for a phase nonlinear distortion, positioned on any of the antenna arrays other than the antenna arrays having the amplitude-phase distortion adding section; and an amplitude-phase control section for controlling an amplitude weighting amount and phase rotation amount on a transmission signal based on each antenna array, in order to beam-control in a designated direction.

2. An array antenna apparatus according to claim 1, wherein the amplitude-phase distortion adding section is connected on an antenna array with the amplitude weighting amount equal to or greater than a predetermined value, any one of an amplitude distortion adding section and a phase distortion adding section being connected on an antenna array with the amplitude weighting amount smaller than the predetermined value.

3. An array antenna apparatus according to claim 2, wherein the amplitude-phase distortion adding section is connected on an antenna array having a distortion occurring in the power amplifier equal to or greater than a predetermined value, any one of an amplitude distortion adding section and a phase distortion adding section being connected on an antenna array having a distortion occurring in the power amplifier smaller than the predetermined value.

4. A radio communications apparatus having an array antenna apparatus according to claim 2.

5. An array antenna apparatus according claim 1, wherein the amplitude-phase distortion adding section is connected on an antenna array having a distortion occurring in the power amplifier equal to or greater than a predetermined value, any one of an amplitude distortion adding section and a phase distortion adding section being connected on an antenna array having a distortion occurring in the power amplifier smaller than the predetermined value.

6. A radio communications apparatus having an array antenna apparatus according to claim 5.

7. A radio communications apparatus having an array antenna apparatus according to claim 1.

8. An array antenna apparatus comprising:

a plurality of antenna elements;

a plurality of power amplifiers respectively connected to the plurality of antenna elements;

a distortion adding section positioned on a plurality of antenna arrays having the antenna element and the power amplifier, to compensate for a nonlinear distortion occurring in the power amplifier;

an amplitude-phase control section for controlling, based on each antenna array, an amplitude weighting amount and phase rotation amount in order to beam-control in a designated direction;

whereby the distortion adding section is configured by using a reconfigurable device, to rewrite a circuit configuration of the reconfigurable device according to the amplitude weighting amount and phase rotation amount.

9. An array antenna apparatus according to claim 8, wherein rewriting a circuit configuration of the reconfigurable device is switching between an antenna array where an amplitude-phase distortion adding circuit exists to compensate for a nonlinear distortion in amplitude and phase occurring in the power amplifier and an antenna array where any one of an amplitude distortion adding circuit to compensate for a nonlinear distortion in amplitude occurring in the power amplifier and a phase distortion adding circuit to compensate for a nonlinear distortion in phase exists.

10. An array antenna apparatus according to claim 9, wherein the plurality of antenna elements configure a circular array antenna.

11. A radio communications apparatus having an array antenna apparatus according to claim 9.

12. An array antenna apparatus according to claim 8, wherein the plurality of antenna elements configure a circular array antenna.

13. A radio communications apparatus having an array antenna apparatus according to claim 12.

14. A radio communications apparatus having an array antenna apparatus according to claim 8.

15. A MIMO communication apparatus comprising:

a plurality of antenna elements;

a plurality of power amplifiers respectively connected to each of antenna elements;

an amplitude phase distortion adding section for compensating for a nonlinear distortion in amplitude and phase occurring in the power amplifier;

a reconfigurable device constituting any one of an amplitude distortion adding section to compensate for a nonlinear distortion in amplitude and a phase distortion adding section to compensate for a nonlinear distortion in phase, and positioned on each of the antenna arrays having the antenna element and the power amplifier;

an amplitude-phase control section for controlling an amplitude weighting amount and phase rotation amount on a transmission signal based on each antenna array, in order to beam-control in a designated direction and a reception antenna for receiving a propagation environment signal to notify a propagation environment of a signal sent at the plurality of antennas;

whereby the amplitude weighting amount and phase rotation amount is determined according to a reception signal from the reception antenna, the amplitude-phase distortion adding section and any one of the amplitude distortion adding section and the phase distortion adding section being arranged according to the amplitude weighting amount and phase rotation amount.

* * * * *